(12) United States Patent
Jin et al.

(10) Patent No.: US 6,985,415 B2
(45) Date of Patent: Jan. 10, 2006

(54) OFFSET SETTING SYSTEM AND METHOD FOR SEEKING CONTROL

(75) Inventors: Kuo-Wen Jin, Hsin-Chu (TW); Han-Wen Hsu, Hsin-Chu (TW)

(73) Assignee: MediaTek Inc., Hsin-Chu (TW)

( * ) Notice: Subject to any disclaimer, the term of this patent is extended or adjusted under 35 U.S.C. 154(b) by 321 days.

(21) Appl. No.: 10/379,660

(22) Filed: Mar. 6, 2003

(65) Prior Publication Data

US 2004/0037181 A1   Feb. 26, 2004

(30) Foreign Application Priority Data

Aug. 22, 2002   (TW) ................................ 91118953 A

(51) Int. Cl.
*G11B 7/00*   (2006.01)

(52) U.S. Cl. ............... 369/47.3; 369/53.29; 369/30.12; 369/47.32; 369/47.33

(58) Field of Classification Search ............... 369/47.3, 369/53.29, 30.12, 30.16, 30.17, 30.23, 47.32, 369/47.33, 47.34

See application file for complete search history.

(56) References Cited

U.S. PATENT DOCUMENTS

| 5,048,001 A | * | 9/1991 | Moriya et al. ............ 369/44.32 |
| 6,157,599 A | * | 12/2000 | Yamashita et al. ........ 369/44.28 |
| 6,298,030 B1 | * | 10/2001 | Maeda ................... 369/124.07 |
| 6,678,235 B1 | * | 1/2004 | Watanabe ................. 369/275.3 |
| 2004/0032799 A1 | * | 2/2004 | Ho ........................... 369/30.16 |

* cited by examiner

*Primary Examiner*—William Korzuch
*Assistant Examiner*—Van Pham
(74) *Attorney, Agent, or Firm*—Troxell Law Office, PLLC

(57) ABSTRACT

The invention is an offset setting system for an optical reading/writing apparatus having an optical pickup head reading/writing digital data under a predetermined velocity on an optical storage media. The apparatus sets the offset including a plurality of buffer blocks when the pickup head crosses storage tracks each time on the media and stop on a target storage track. The offset is to steady the pickup head to read/write data on a target block of the target storage track. A buffer time estimating module estimates an average time for the pickup head crossing a buffer block under a predetermined velocity, defining as a buffer time. The buffer blocks setting module records a steady time for the pickup head steadying to read/write data on the target block, and sets the number of the buffer blocks by a predetermined setting process in the offset based on the buffer time and the steady time.

22 Claims, 5 Drawing Sheets

FIG. 1(The Prior Art)

FIG. 2 (The Prior Art)

OFFSET SETTING SYSTEM AND METHOD FOR SEEKING CONTROL

BACKGROUND OF THE INVENTION

1. Field of the Invention

The present invention relates to an offset setting system, and more particularly, an offset setting system used when an optical pickup head proceeds a tracking close loop.

2. Description of the Prior Art

Please refer to FIG. 1. FIG. 1 is a schematic diagram that an optical reading/writing apparatus 10 reads/writes an optical storage medium 14 according to the prior art. The optical reading/writing apparatus 10 in the prior art comprises an optical pickup head 12, and reads/writes data on an optical storage medium 14. The optical storage medium 14 comprises a spiral storage track 16. The spiral storage track 16 comprises a series of blocks for storing data. When the optical pickup head 12 reads/writes data on the optical storage medium 14, it reads/writes data on the spiral storage track 16 by locking onto the spiral storage track 16 on the optical storage medium 14.

When the optical reading/writing apparatus 10 uses the optical pickup head 12 to read/write data stored on the optical storage medium 14, the optical reading/writing apparatus 10 rotates the optical storage medium 14, so that the optical pickup head 12 can read/write data on different blocks. Different optical reading/writing apparatuses may have different predetermined reading/writing velocities. Usually "velocity (X)" is used to distinguish different optical reading/writing apparatuses with different predetermined velocities, for instance, a 4X, 16X or 48X optical reading/writing apparatus. The higher the velocity is, the faster the optical pickup head reads and writes. Actually, there are two modes for the velocity of the optical pickup head 12. One is constant linear velocity mode (CLV mode), the other is constant angular velocity mode (CAV mode).

Under the CLV mode, the predetermined velocity of the optical reading/writing apparatus 10 relates to a constant linear velocity. The optical pickup head 12 reads/writes digital data in different blocks on the optical storage medium 14 with a constant linear velocity.

Under the CAV mode, the optical reading/writing apparatus 10 rotates the optical storage medium 14 with a constant angular velocity. That means the optical pickup head 12 reads/writes a circle of data on the optical storage medium 14 with a constant velocity. Thus, when the optical pickup head 12 reads/writes data on an inner circle of the optical storage medium 14, the linear velocity becomes slower. When the optical pickup head 12 reads/writes data in an outer circle of the optical storage medium 14, the linear velocity becomes faster. While the optical pickup head 12 reads/writes data in different blocks on the same circle, the linear velocity is consistent.

No matter under which mode, when the optical pickup head 12 reads/writes data, it often needs to read/write data from/on different data blocks on the optical storage medium 14. When the optical pickup head 12 is in the data block A but needs to read/write data on a target data block C, the optical pickup head 12 needs to jump from the data block A to the data block B first, and then from the data block B to the target data block C. It is because the optical pickup head can only move in a radial direction, and can't jump to the target data block C precisely. After moving to the target data block C, the optical pickup head 12 then can lock on the storage track 16 again and reads/writes data on the target block C.

Although the optical storage medium 14 only has one spiral storage track 16, the optical pickup head 12 seems to cross lots of storage tracks as it moves from the data block A to B. The movement from the data block A to the data block B is called Seek. After seeking, due to jumping over tracks, slight shack or even the optical pickup head 12 deviating from the target storage track may occur. Therefore, the optical pickup head 12 has to return to a steady status before it is available for reading/writing. The status, which is available, is for reading/writing. It is called tracking close loop as the optical pickup head 12 moves from not available to steady and available for reading/writing, as from the data block B to C in FIG. 1. This area from the data block B to the target data block C is called offset. The period, the optical pickup head 12 from ending seeking to be steady for reading data, is called a steady time. Because setting an offset can assist an optical pickup head in reading data on the target data block C steadily, the setting of an offset is very important to the movement of tracking close loop by the optical pickup head. Moreover, when setting the offset length according to the prior art, the offset length is set at a constant value no matter under which mode or what velocity the optical pickup head are.

Please refer to FIG. 2. FIG. 2 is a schematic diagram of an offset from the data block B to the target data block C on the optical storage medium 14 according to FIG. 1. In this example in FIG. 2, there are six data blocks from the data block B to the target data block C. This represents that the offset length is six data blocks.

However, there are some disadvantages for a constant offset length. If the constant offset length is too large, the time that the optical pickup head proceeds a tracking close loop is too long, resulting that the reading/writing time is too long. If the constant offset length is too short, the optical pickup head may exceed the target block but can't read/write data, resulting in data reading/writing failure.

Moreover, if the offset length is constant, the steady time for an optical pickup head reduces as the velocity of the optical pickup head reads/writes increases. For instance, the steady time for the 2X optical pickup head is half of that for the 1X optical pickup head, and the steady time for the 4X optical pickup head is half of that for the 2X optical pickup head. Thus, the optical pickup head 12 must be designed to read/write data faster and more steadily. This causes difficulties in manufacturing and setting an optical pickup head.

SUMMARY OF THE INVENTION

It is therefore a primary objective of the present invention to provide an offset setting system and method, so that an optical pickup head can be steadily to read/write data in a target data block with a best timing. This present invention can avoid the disadvantages from constant offset length in the prior art.

The present invention relates to an offset setting system. The offset setting system is used in an optical reading/writing apparatus comprising an optical pickup head. The optical pickup head reads/writes digital data under a predetermined velocity on an optical storage medium. The optical reading/writing apparatus sets an offset comprising a plurality of buffer blocks when the optical pickup head crosses a plurality of storage tracks on the optical storage medium, and stops on a target storage track each time. The offset is used to steady the optical pickup head to read/write data on a target block of the target storage track.

The offset setting system comprises a buffer time estimating module and a buffer block setting module. The buffer time estimating module is used to estimate an average time when the optical pickup head crosses a buffer block under the predetermined velocity. The average time is also defined as a buffer time. The buffer block setting module records a steady time for the optical pickup head being steadied to read/write data, and sets the number of buffer blocks in the offset by a predetermined setting process based on the steady time and the buffer time.

The offset setting system of the present invention can set an offset length automatically according to the buffer time and the steady time, so the optical pickup head can lock onto the target block with a best timing, and can avoid the disadvantages of the constant offset length in the prior art.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

Figure 1:
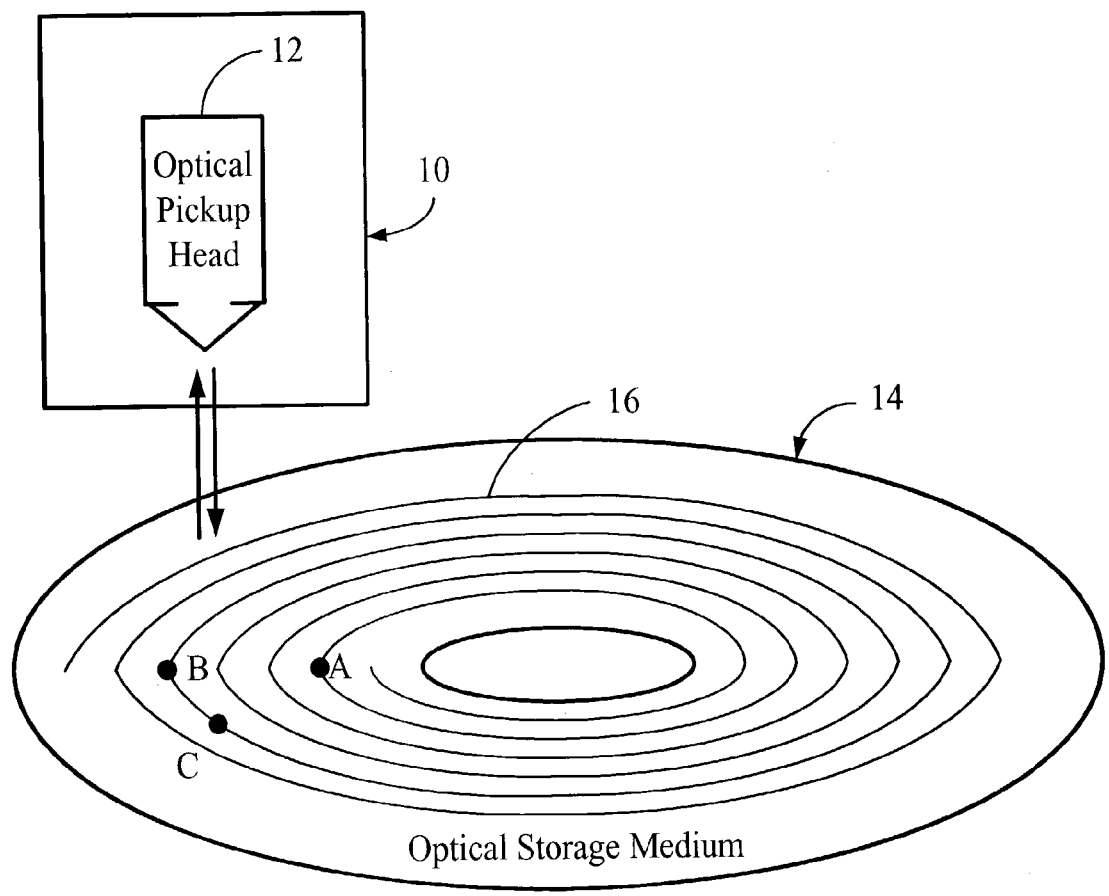
FIG. 1 is a schematic diagram that an optical reading/writing apparatus reads/writes an optical storage medium according to the prior art.
Figure 2:
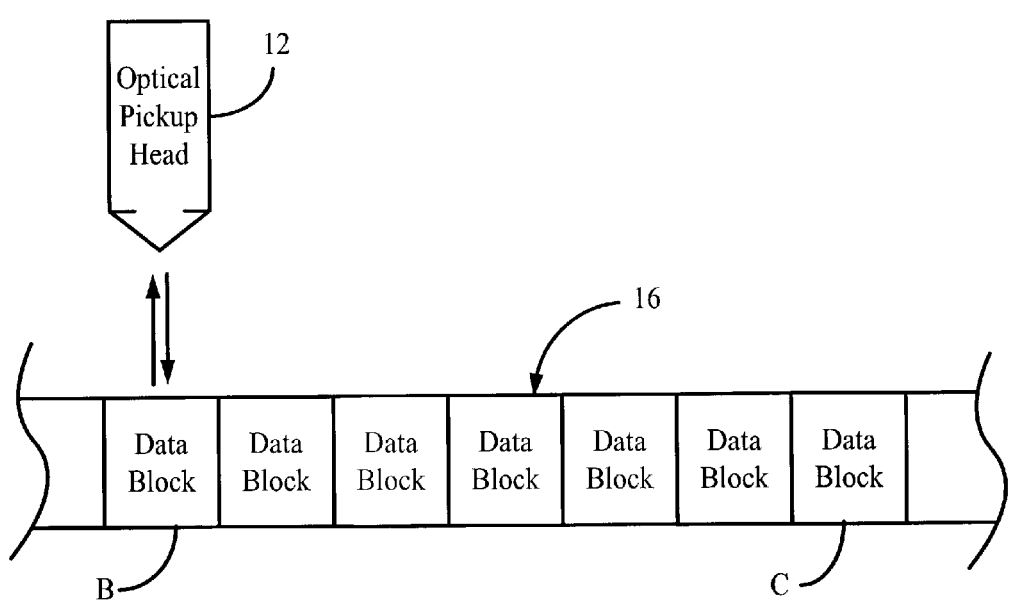
FIG. 2 is a schematic diagram of an offset from a data block to a target block on an optical storage medium according to FIG. 1.
Figure 3:
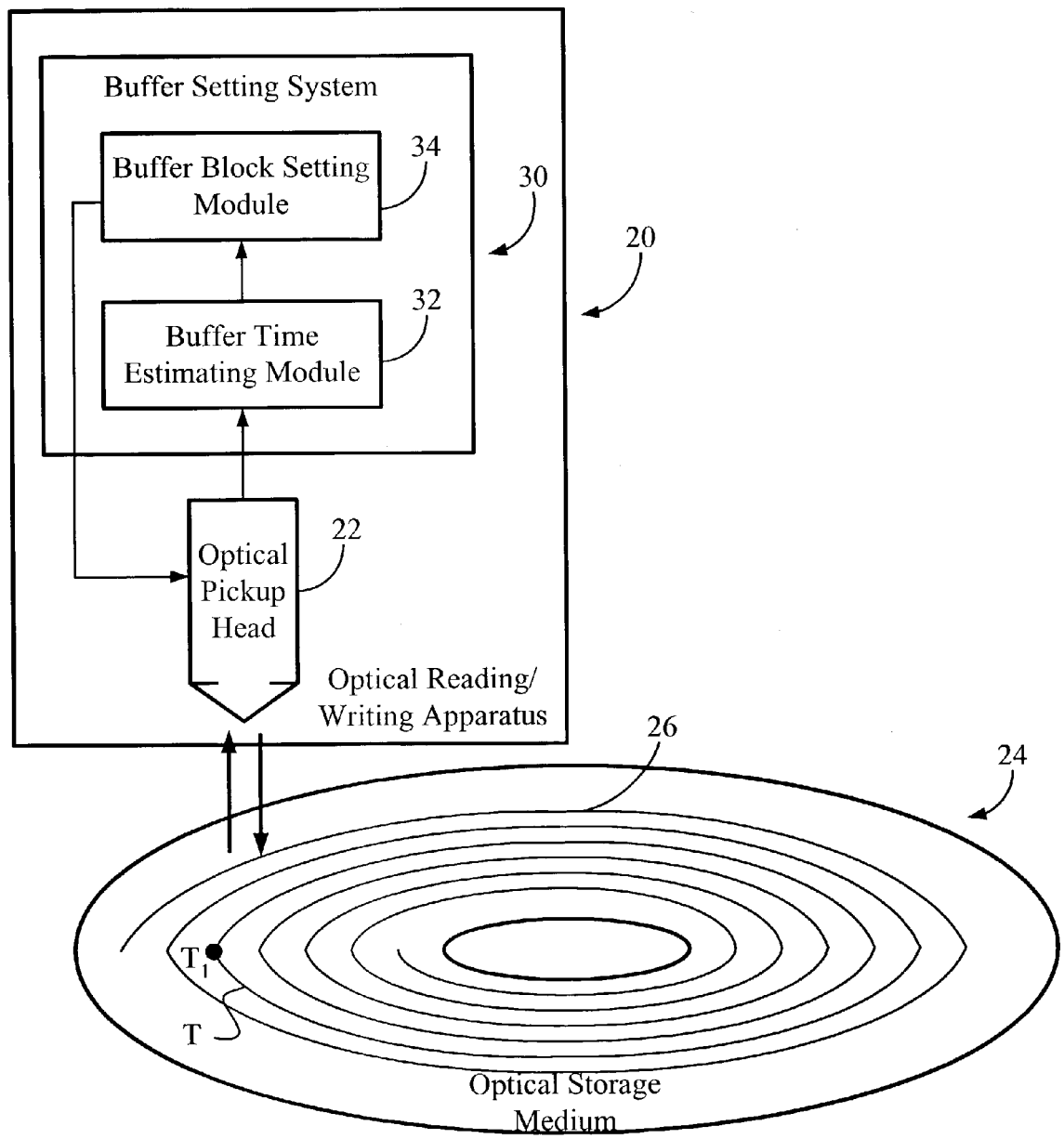
FIG. 3 is a schematic diagram of the offset setting system and an optical storage medium of the present invention.
Figure 4:
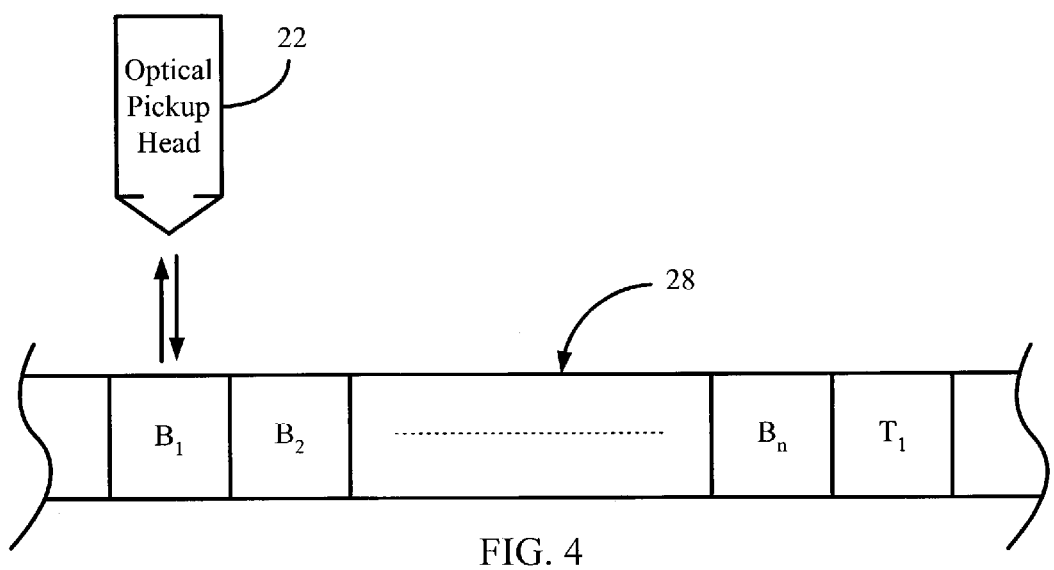
FIG. 4 is a schematic diagram of an offset set by the offset setting system according to FIG. 3.

Please refer to FIG. 3 and FIG. 4. FIG. 3 is a schematic diagram of an offset setting system 30 and an optical storage medium 24 of the present invention. FIG. 4 is a schematic diagram of an offset 28 set by offset setting system 30 according to FIG. 3. The offset setting system 30 of the present invention is used in an optical reading/writing apparatus 20. The optical reading/writing apparatus 20 comprises an optical pickup head 22, and reads/writes digital data under a predetermined velocity on an optical storage medium 24. The optical reading/writing apparatus 20 sets an offset 28 including a plurality of buffer blocks B1, B2, . . . and Bn (n is a positive integral larger than or equal to one) when each time the optical pickup head 22 crosses a plurality of storage tracks 26 on the optical storage medium 24 and stops on a target storage track T. The optical pickup head 22 steadies in the offset 28 to read/write data in a target block T1 of the target storage track T. So-called buffer block target block in the detailed description and so-called data block in the background all refer to the unit for recording data in an optical storage medium. However, different denominations are given to differentiate each function.

As shown in FIG. 3, the offset setting system 30 of the present invention comprises a buffer time estimating module 32 and a buffer block setting module 34. The buffer time estimating module 32 is used to estimate an average time when the optical pickup head 22 crosses a buffer block Bn under the predetermined velocity. The average time is defined as a buffer time Ts (not shown here). The buffer block setting module 34 records a steady time Tt (not shown here) for that the optical pickup head 24 steadies to read/write data. The buffer block setting module 34 sets a number of buffer blocks in the offset 28 by a predetermined setting process based on the steady time Tt and the buffer time Ts.

There are two possible modes as the optical reading/writing apparatus 20 reads/writes data on the optical storage medium 24. One is CLV mode, the other is CAV mode. Under the CLV mode, the predetermined setting process of the present invention can be implemented by the following Formula 1 to obtain the number of buffer blocks Bn in the offset 28:

the number of buffer blocks=a linear velocity coefficient×the predetermined linear velocity+a linear velocity constant  Formula 1:

In the formula 1, the linear velocity coefficient and the linear velocity constant are determined by the buffer time Ts and the steady time Tt. For instance, the offset setting system of the present invention detects and obtains the buffer time for a 4X-velocity optical pickup head reading/writing a block is 3.33 milli-second (ms), and the steady time is 3 ms. The needed offset length for the 4X-velocity optical pickup head is one buffer block according to the above data. The predetermined velocity of a 16X-velocity optical pickup head is four times as the 4X-velocity optical pickup head, so the buffer time is 3.33/4=0.83 ms. But the steady time the 16X-velocity optical pickup head is still 3 ms constantly. Accordingly, the needed offset length for the 16X-velocity optical pickup head is four buffer blocks The above two sets of data are applied into the formula 1 to obtain the linear velocity coefficient as 0.25 and the linear velocity constant as zero. After obtaining the linear velocity coefficient and the linear velocity constant, the system of the present invention applies the predetermined linear velocity (the same as the "velocity" of the optical pickup head) into the formula 1, and then obtains the offset length for the predetermined linear velocity.

Under the CAV mode, the above-mentioned predetermined angular velocity can be transferred to a corresponding linear velocity according to which track (or which circle) on the optical storage medium 24 is being read/written data by the optical pickup head 22. Under the predetermined angular velocity, when the optical pickup head 22 reads/writes data on blocks of different storage tracks (or circles), there are different linear velocities. The predetermined setting process of the present invention is implemented by the following formula 2 to obtain the number of buffer blocks in the offset 28:

the number of buffer blocks=an angular velocity coefficient×the linear velocity transferred from the angular velocity+an angular velocity constant  Formula 2:

The formula 2 is similar to the formula 1 wherein the buffer time Ts and the steady time Tt of the optical pickup head 22 under a certain linear velocity are used to obtain the linear velocity coefficient and the linear velocity constant, leading to obtain the angular velocity coefficient and the angular velocity constant in the formula 2. For example, if the linear velocity is 16X when the optical pickup head 22 is on the first storage track (the first circle from the internal side) of the optical storage medium 24, the needed buffer time is 0.83 ms and the needed steady time is 3 ms (as the CLV mode). According to these data, the needed offset length is four buffer blocks when that optical pickup head 22 desires to read the target block located on the first storage track of the optical storage medium. If the linear velocity is 48X when the optical pickup head is on the last storage track of the optical storage medium, the needed buffer time is 0.83/3=0.28 ms, and the needed steady time is the same as 3 ms. The needed offset length is twelve buffer blocks.

According to the above-mentioned two sets of data, the linear velocity is transferred from the angular velocity of the optical pickup head via information of the located storage track. The angular velocity coefficient is then 0.25, and the angular linear constant is zero. After obtaining the angular velocity coefficient and the angular velocity constant, the system of the present invention applies the linear velocity of the optical reading/writing apparatus on a certain storage track of the optical storage medium (the same as the "velocity" of the optical pickup head) to the formula 2. The offset length for the linear velocity then is obtained.

Under the CAV mode, the angular velocity in the formula 2 can be transferred according to the location of the corresponding block on the optical storage medium 24 where the optical pickup head 22 is on, leading to a formula 3.

> the number of buffer blocks=a block coefficient×the corresponding location of the block+a block constant    Formula 3:

For example, if an optical storage medium has a storage volume with 80 min, the linear velocity is 16X when the optical pickup head is in the zero min location of the optical storage medium (assuming in the zero block of the optical storage medium). As the above-mentioned description, the offset length needed is four buffer blocks. When the optical pickup head is in the 80 min location of the optical storage medium (assuming in the 80th block of the optical storage medium), the linear velocity increases to 48X. Therefore, the offset length needed is twelve buffer blocks. The above two sets of data are applied into the formula 3 to obtain the block coefficient as 0.1 and the block constant as 4. After obtaining the block coefficient and the block constant, the system of the present invention just applies the location of the optical storage medium, where the optical apparatus locates, into the formula 1. The offset length for this location can be obtained. It must be noted that the optical storage medium has several blocks wherein one block is not necessary to represent the storage volume for one minute. In order to easily explain the formula 3, it is assumed that one block represents the storage volume for one minute.

To sum up the above-mentioned descriptions, in all formulas 1, 2 and 3 according to the present invention, the spirit is to test for the buffer time for the optical pickup head reading/writing one buffer block to further obtain the predetermined velocity of the optical pickup head. According to the steady time of the optical pickup head, it then can determine the offset length needed for the tracking close loop by the optical pickup head, and then apply the coefficient and constant obtained from the test into the corresponding formula. Therefore, the offset length for the predetermined velocity of the optical pickup head then can be obtained by determining the predetermined velocity of the optical pickup head according to the time needed for the optical pickup head reading/writing a buffer block.

It needs to be noted that the formulas mentioned above are used to clearly describe the basic application of the present invention. Every formula can be evolved by changing the velocity with a power. For example, the formula 1 can be changed to:

> the number of buffer blocks=a linear velocity coefficient×(a predetermined linear velocity)$^2$+a linear velocity constant    Formula 1A:

The difference between the formulas 1 and 1A is only in the velocity variable. What in the formula 1 is the linear velocity to the power of one, but what in the formula 1A is the linear velocity to the power of two. No matter which formula, the buffer time and the steady time are needed first to determine the linear velocity coefficient and the linear velocity constant. Then, filling in the linear velocity at that time can obtain the number of buffer blocks needed. Thus, The linear velocity to power of 1, 2, 3, . . . or n (n may be any number) is embodiments of the present invention. For the same reason, the velocity and the location of the block variables in the formula 2 and 3 can be changed with a power number to become other embodiments. In addition, each of the variables in each of the formulas (such as the constant, the coefficient or the velocity) can be changed with a power number to become other embodiments of the present invention.

Figure 5:
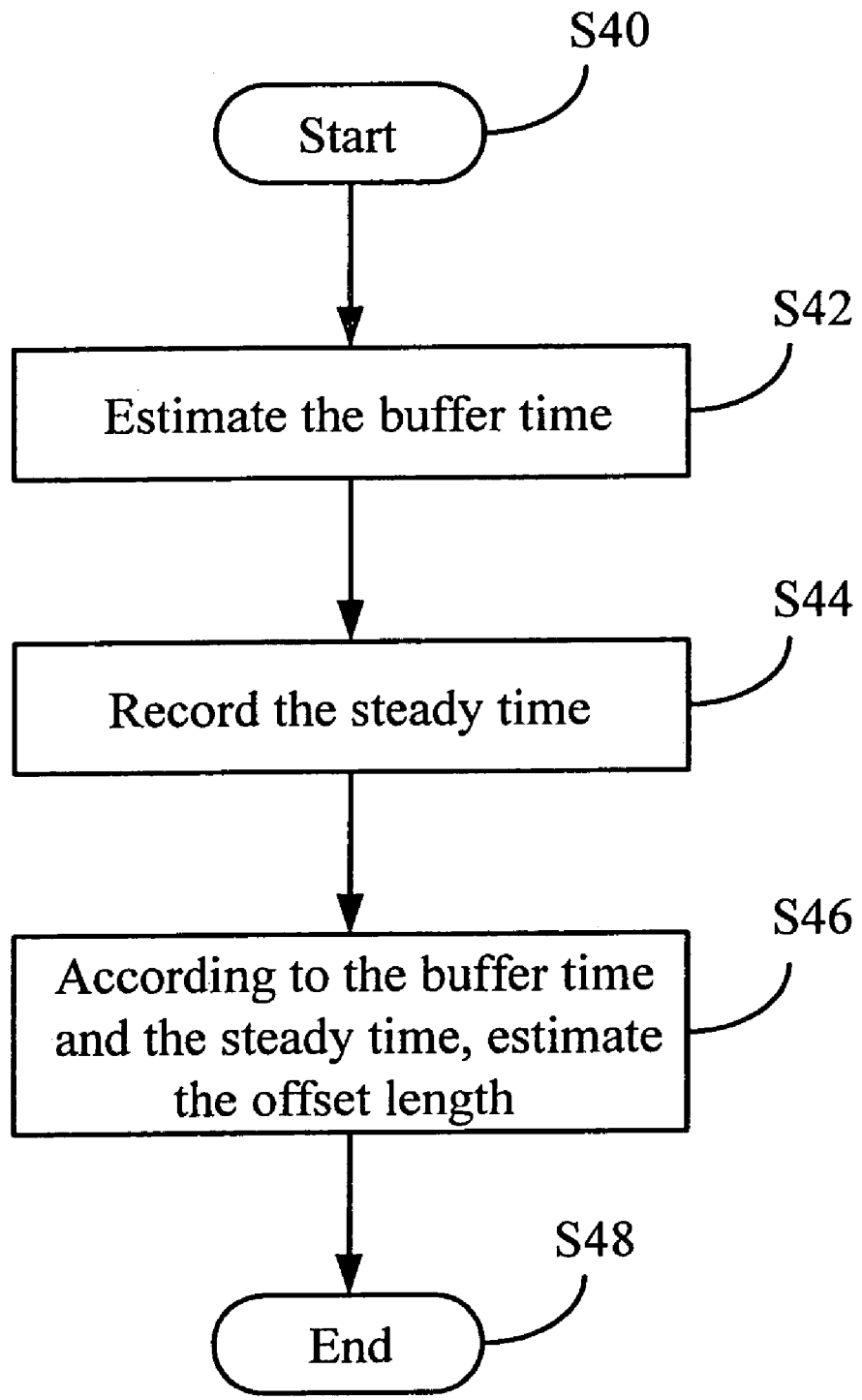
FIG. 5 is a flow chart of the offset setting method in the present invention.

Please refer to FIG. 5. FIG. 5 is a flow chart of the offset setting method in the present invention. The offset setting method of the present invention comprises the following steps:

Step S40: starting;

Step S42: calculating an average time for the optical pickup head 22 crosses a buffer block Bn under a predetermined velocity, the average time being defined as a buffer time Ts;

Step S44: recording a steady time Tt for the optical pickup head 22 becoming steady to read/write data; and Step S46: setting the number of buffer blocks Bn in the offset 28 by a predetermined setting process based on the buffer time Ts and the steady time Tt.

Step S48: ending.

Comparing to the prior art, the offset setting system and method in the present invention can set the offset length automatically based on the buffer time (the linear velocity of the pick up head) and the steady time of the optical pickup head, so the optical pickup head can lock onto the target block with the best timing and avoid the disadvantages of constant offset length in the prior art.

With the examples and explanations above, the features and spirit of the invention will hopefully be described clearly and completely. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An offset setting system for an optical reading/writing apparatus having an optical pickup head, said optical pickup head reading/writing digital data under a predetermined velocity on an optical storage media, said optical reading/writing apparatus setting an offset including a plurality of buffer blocks when said optical pickup head crosses a plurality of storage tracks each time on said optical storage media and stop on a target storage track, said offset being used to steady said optical pickup head to read/write data on a target block of said target storage track, said system comprising:

a buffer time estimating module for estimating an average time when said optical pickup head crosses a buffer block under said predetermined velocity, said average time being defined as a buffer time; and a buffer block setting system module for recording a steady time for said optical pickup head being steadied to read/write data, and setting the number of buffer blocks in said offset by a predetermined setting process based on said buffer time and said steady time.

2. The offset setting system of claim 1, wherein said predetermined velocity is a predetermined linear velocity, and said optical reading/writing apparatus makes said optical pickup head read/write data on the different blocks of said optical storage media under said predetermined linear velocity.

3. The offset setting system of claim 2, wherein said predetermined setting process is implemented by the following formula to obtain the number of buffer blocks in said offset:

said number of buffer blocks=a linear velocity coefficient×said predetermined linear velocity+a linear velocity constant.

4. The offset setting system of claim 3, wherein said linear velocity coefficient and said linear velocity constant are determined by said buffer time and said steady time.

5. The offset setting system of claim 1, wherein said predetermined velocity is a predetermined angular velocity, and said optical reading/writing apparatus makes said optical pickup head read/write data on the different blocks of said optical storage media under said predetermined angular velocity.

6. The offset setting system of claim 5, wherein said predetermined angular velocity is transferred to a linear velocity corresponding to said target storage track.

7. The offset setting system of claim 6, wherein said predetermined setting process is implemented by the following formula to obtain the number of buffer blocks in said offset:

said number of buffer blocks=an angular velocity coefficient×said linear velocity+an angular velocity constant.

8. The offset setting system of claim 7, wherein said angular velocity coefficient and said angular velocity constant are determined by said buffer time and said steady time.

9. The offset setting system of claim 5, wherein said predetermined angular velocity is transferred to a linear velocity corresponding to each of said plurality of target blocks.

10. The offset setting system of claim 9, wherein said predetermined setting process is implemented by the following formula to obtain the number of buffer blocks in said offset:

said number of buffer blocks=a block coefficient×said block+a block constant.

11. The offset setting system of claim 10, wherein said block coefficient and said block constant are determined by said buffer time and said steady time.

12. An offset setting method for an optical reading/writing apparatus having an optical pickup head, said optical pickup head reading/writing digital data under a predetermined velocity on an optical storage media, said optical reading/writing apparatus setting an offset including a plurality of buffer blocks when said optical pickup head crosses a plurality of storage tracks each time on said optical storage media and stop on a target storage track, said offset being used to steady said optical pickup head to read/write data on a target block of said target storage track, said method comprising:

estimating an average time when said optical pickup head crosses a buffer block under said predetermined velocity, said average time being defined as a buffer time;

recording a steady time for said optical pickup head steadying to read/write data; and setting the number of buffer blocks in said offset by a predetermined setting process based on said buffer time and said steady time.

13. The offset setting method of claim 12, wherein said predetermined velocity is a predetermined linear velocity, and said optical reading/writing apparatus makes said optical pickup head read/write data under said predetermined linear velocity in the different blocks of said optical storage media.

14. The offset setting method of claim 13, wherein said predetermined setting process is implemented by the following formula to obtain the number of buffer blocks in said offset:

said number of buffer blocks=a linear velocity coefficient×said predetermined linear velocity+a linear velocity constant.

15. The offset setting method of claim 14, wherein said linear velocity coefficient and said linear velocity constant are determined by said buffer time and said steady time.

16. The offset setting method claim 12, wherein said predetermined velocity is a predetermined angular velocity, and said optical reading/writing apparatus makes said optical pickup head read/write data under said predetermined angular velocity in the different blocks of said optical storage media.

17. The offset setting system of claim 16, wherein said predetermined angular velocity is transferred to a linear velocity corresponding to said target storage track.

18. The offset setting system of claim 17, wherein said predetermined setting process is implemented by the following formula to obtain the number of buffer blocks in said offset:

said number of buffer blocks=an angular velocity coefficient×said linear velocity+an angular velocity constant.

19. The offset setting system of claim 18, wherein said angular velocity coefficient and said angular velocity constant are determined by said buffer time and said steady time.

20. The offset setting system of claim 16, wherein said predetermined angular velocity is transferred to a linear velocity corresponding to each of said plurality of target blocks.

21. The offset setting system of claim 20, wherein said predetermined setting process is implemented by the following formula to obtain the number of buffer blocks in said offset:

said number of buffer blocks=a block coefficient×said block+a block constant.

22. The offset setting system of claim 21, wherein said block coefficient and said block constant are determined by said buffer time and said steady time.

* * * * *